(12) United States Patent
Boehm

(10) Patent No.: US 10,616,218 B2
(45) Date of Patent: Apr. 7, 2020

(54) DRIVER IDENTIFICATION AND AUTHENTICATION SYSTEMS AND METHODS

(71) Applicant: Gentex Corporation, Zeeland, MI (US)

(72) Inventor: Neil J. Boehm, Allegan, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/443,164

(22) Filed: Feb. 27, 2017

(65) Prior Publication Data

US 2018/0097804 A1  Apr. 5, 2018

Related U.S. Application Data

(60) Provisional application No. 62/403,425, filed on Oct. 3, 2016, provisional application No. 62/404,026, filed on Oct. 4, 2016.

(51) Int. Cl.
*H04L 29/06* (2006.01)
*G06Q 20/40* (2012.01)
(Continued)

(52) U.S. Cl.
CPC ............ *H04L 63/0861* (2013.01); *G06F 8/65* (2013.01); *G06Q 20/145* (2013.01);
(Continued)

(58) Field of Classification Search
CPC ...... G06F 8/65; G06Q 20/145; G06Q 20/405; G06Q 20/40145; H04L 63/0861;
(Continued)

(56) References Cited

U.S. PATENT DOCUMENTS 5,708,415 A  1/1998  Van Lente et al.
5,854,593 A  12/1998  Dykema et al.
(Continued)

FOREIGN PATENT DOCUMENTS

RU  2547022 C2  10/2015
WO  2005016709 A1  2/2005

OTHER PUBLICATIONS

M. J. Flores, J. M. Armingol and A. D. La Escalera, "Driver drowsiness detection system under infrared illumination for an intelligent vehicle," in IET Intelligent Transport Systems, vol. 5, No. 4, pp. 241-251, Dec. 2011. (Year: 2011).*
(Continued)

*Primary Examiner* — Andrew M. Lyons
(74) *Attorney, Agent, or Firm* — Price Heneveld LLP; Bradley D. Johnson

(57) ABSTRACT

A method for processing a security authorization is disclosed. The method comprises capturing biometric data with a scanning apparatus of the authentication system and comparing the biometric data to authentication data. The authentication data comprises an identification profile configured to authenticate a previously identified individual. The method further comprises authenticating the previously identified individual based on the identification profile thereby identifying an authorized user and accessing a plurality of occupant parameters in response to the authentication profile. The occupant parameters are then communicated to the vehicle control system. The vehicle control system is configured to load the occupant parameters to customize one or more operational settings of a vehicle.

18 Claims, 7 Drawing Sheets

(51) Int. Cl.
  *H04W 12/08* (2009.01)
  *H04W 4/40* (2018.01)
  *H04W 12/06* (2009.01)
  *G06F 8/65* (2018.01)
  *G06Q 20/14* (2012.01)

(52) U.S. Cl.
  CPC ..... *G06Q 20/405* (2013.01); *G06Q 20/40145* (2013.01); *H04L 63/102* (2013.01); *H04L 63/105* (2013.01); *H04W 4/40* (2018.02); *H04W 12/06* (2013.01); *H04W 12/08* (2013.01)

(58) Field of Classification Search
  CPC .... H04L 63/102; H04L 63/105; H04W 12/06; H04W 12/08
  USPC .................................................. 717/168–178
  See application file for complete search history.

(56) References Cited

U.S. PATENT DOCUMENTS

| | | | |
|---|---|---|---|
| 6,091,343 A | 7/2000 | Dykema et al. | |
| 6,232,874 B1 | 5/2001 | Murphy | |
| 6,572,233 B1 | 6/2003 | Northman et al. | |
| 7,013,293 B1* | 3/2006 | Kipnis | G06Q 20/102 705/40 |
| 7,551,987 B2* | 6/2009 | Ota | G08B 21/06 340/576 |
| 7,812,712 B2* | 10/2010 | White | A61B 5/145 340/426.2 |
| 8,237,909 B2 | 8/2012 | Ostreko et al. | |
| 8,339,526 B2 | 12/2012 | Minikey, Jr. et al. | |
| 8,411,245 B2 | 4/2013 | Lee et al. | |
| 8,465,162 B2* | 6/2013 | Weller | B60R 1/12 359/879 |
| 8,872,908 B2* | 10/2014 | Martin | G06K 9/00033 348/65 |
| 9,569,403 B2* | 2/2017 | Petersen | G06F 17/00 |
| 9,767,264 B2* | 9/2017 | Morita | G06F 21/31 |
| 9,898,619 B1* | 2/2018 | Hadsall | G06F 21/6245 |
| 2003/0142849 A1* | 7/2003 | Lemelson | B60Q 1/0023 382/104 |
| 2005/0131607 A1* | 6/2005 | Breed | B60N 2/002 701/45 |
| 2006/0206251 A1* | 9/2006 | Barker | B60N 2/0252 701/49 |
| 2007/0133949 A1* | 6/2007 | Tatsuta | B60R 11/0217 386/230 |
| 2007/0154063 A1* | 7/2007 | Breed | B60N 2/028 382/100 |
| 2008/0069403 A1* | 3/2008 | Breed | B60K 28/066 382/104 |
| 2008/0168437 A1* | 7/2008 | Chen | G06F 21/6218 717/176 |
| 2008/0252412 A1* | 10/2008 | Larsson | B60R 25/25 340/5.2 |
| 2008/0292146 A1* | 11/2008 | Breed | B60N 2/002 382/118 |
| 2010/0046059 A1* | 2/2010 | McCabe | B60R 1/12 359/267 |
| 2010/0088692 A1* | 4/2010 | Rathi | G06F 8/65 717/171 |
| 2010/0158327 A1* | 6/2010 | Kangas | G06F 21/316 382/124 |
| 2012/0242820 A1* | 9/2012 | Hanna | G06K 9/00221 348/78 |
| 2013/0215275 A1* | 8/2013 | Berini | G06F 21/32 348/150 |
| 2014/0195477 A1* | 7/2014 | Graumann | G06K 9/00369 707/609 |
| 2014/0306826 A1* | 10/2014 | Ricci | H04W 4/21 340/573.1 |
| 2014/0309790 A1* | 10/2014 | Ricci | H04W 4/21 700/276 |
| 2014/0337930 A1* | 11/2014 | Hoyos | H04L 63/10 726/4 |
| 2015/0085096 A1* | 3/2015 | Smits | G02B 23/02 348/78 |
| 2015/0092056 A1* | 4/2015 | Rau | G08G 1/167 348/148 |
| 2015/0092059 A1* | 4/2015 | Lu | H04N 5/2258 348/148 |
| 2015/0135308 A1* | 5/2015 | Smith | G06F 21/32 726/19 |
| 2015/0321641 A1* | 11/2015 | Abou Mahmoud | B60R 25/2018 701/2 |
| 2015/0363986 A1* | 12/2015 | Hoyos | G07C 9/00563 340/5.61 |
| 2016/0012217 A1* | 1/2016 | Wolf | G06F 21/83 726/18 |
| 2016/0050356 A1* | 2/2016 | Nalepka | H04N 5/23203 348/148 |
| 2016/0078293 A1* | 3/2016 | Hanna | G06K 9/00617 382/117 |
| 2016/0125240 A1* | 5/2016 | Danikhno | G06F 21/32 348/78 |
| 2016/0161266 A1* | 6/2016 | Crawford | G01C 21/34 701/25 |
| 2016/0264054 A1* | 9/2016 | Uken | B60R 1/088 |
| 2016/0267319 A1* | 9/2016 | Murillo | G06K 9/00255 |
| 2017/0061110 A1* | 3/2017 | Wright | G06F 21/32 |
| 2017/0066406 A1* | 3/2017 | Ricci | G06F 3/013 |
| 2017/0113627 A1* | 4/2017 | Ding | B60R 1/04 |
| 2017/0116804 A1* | 4/2017 | Bae | G07C 9/00896 |
| 2017/0174158 A1* | 6/2017 | Ding | B60R 16/037 |
| 2017/0213474 A1* | 7/2017 | Welles | G09B 9/052 |
| 2018/0059913 A1* | 3/2018 | Penilla | H04W 4/44 |
| 2018/0072227 A1* | 3/2018 | Kato | B60R 1/00 |
| 2018/0078731 A1* | 3/2018 | Wendt | B60Q 3/18 |
| 2019/0039570 A1 | 2/2019 | Foster et al. | |

OTHER PUBLICATIONS

E. Murphy-Chutorian, A. Doshi and M. M. Trivedi, "Head Pose Estimation for Driver Assistance Systems: A Robust Algorithm and Experimental Evaluation," 2007 IEEE Intelligent Transportation Systems Conference, Seattle, WA, 2007, pp. 709-714. (Year: 2007).*

J. Wang, H. Chou, S. Chen and C. Fuh, "Image compensation for improving extraction of driver's facial features," 2014 International Conference on Computer Vision Theory and Applications (VISAPP), Lisbon, 2014, pp. 329-338. (Year: 2014).*

International Search Report and Written Opinion of the International Searching Authority, or the Declaration, dated Aug. 17, 2017, for International Application No. PCT/US2017/019692, filed Feb. 27, 2017, 9 pages.

* cited by examiner

US 10,616,218 B2

DRIVER IDENTIFICATION AND AUTHENTICATION SYSTEMS AND METHODS

CROSS-REFERENCE TO RELATED APPLICATIONS

This application claims priority to and the benefit under 35 U.S.C. § 119(e) of U.S. Provisional Patent Application Nos. 62/403,425, filed on Oct. 3, 2016, entitled "DRIVER IDENTIFICATION AND AUTHENTICATION SYSTEMS AND METHODS," and 62/404,026, filed on Oct. 4, 2016, entitled "DRIVER IDENTIFICATION AND AUTHENTICATION SYSTEMS AND METHODS," the disclosures of which are hereby incorporated herein by reference in their entireties.

TECHNOLOGICAL FIELD

The present disclosure relates generally to a security accessory for a vehicle and more particularly relates to security accessory configured to assist in an authentication of a vehicle occupant.

SUMMARY

In one aspect of the present disclosure, an authentication system is disclosed. The authentication system may comprise a communication circuit configured to communicate with a remote server and at least one scanning apparatus configured to capture biometric data. A controller of the system is configured to receive a request for a security authorization from the vehicle control system. In response to the request, the controller may be configured to capture the biometric data with the scanning apparatus and compare the biometric data to authentication data. The authentication data comprises a first identification profile configured to authenticate a previously identified individual. The controller is further configured to authenticate the previously identified individual based on the first identification profile thereby identifying an authorized user and communicate a privilege level associated with the first identification profile. The vehicle control system is configured to determine the security authorization in response to the privilege level.

In another aspect of the present disclosure, a method for processing a security authorization is disclosed. The method comprises capturing biometric data with a scanning apparatus of the authentication system and comparing the biometric data to authentication data. The authentication data comprises an identification profile configured to authenticate a previously identified individual. The method further comprises authenticating the previously identified individual based on the identification profile thereby identifying an authorized user and accessing a plurality of occupant parameters in response to the authentication profile. The occupant parameters are then communicated to the vehicle control system. The vehicle control system is configured to load the occupant parameters to customize one or more operational settings of a vehicle.

In yet another aspect of the present disclosure, an authentication system is disclosed. The system comprises a communication circuit configured to communicate with a remote server and at least one scanning apparatus configured to capture biometric data. The system further comprises a controller in communication with the communication circuit and the scanning apparatus. The controller is configured to receive a notification of a pending software update to the vehicle control system from the communication circuit. In response to the notification, the system is configured to capture the biometric data with the scanning apparatus. The system may then compare the biometric data to authentication data. The authentication data comprises an identification profile configured to authenticate a previously identified individual. The system is configured to authenticate the previously identified individual based on the identification profile thereby identifying an authorized user and further enable a vehicle control system to activate a software update routine configured to apply the software update.

These and other features, advantages, and objects of the present device will be further understood and appreciated by those skilled in the art upon studying the following specification, claims, and appended drawings.

DETAILED DESCRIPTION OF EMBODIMENTS

Figure 1:
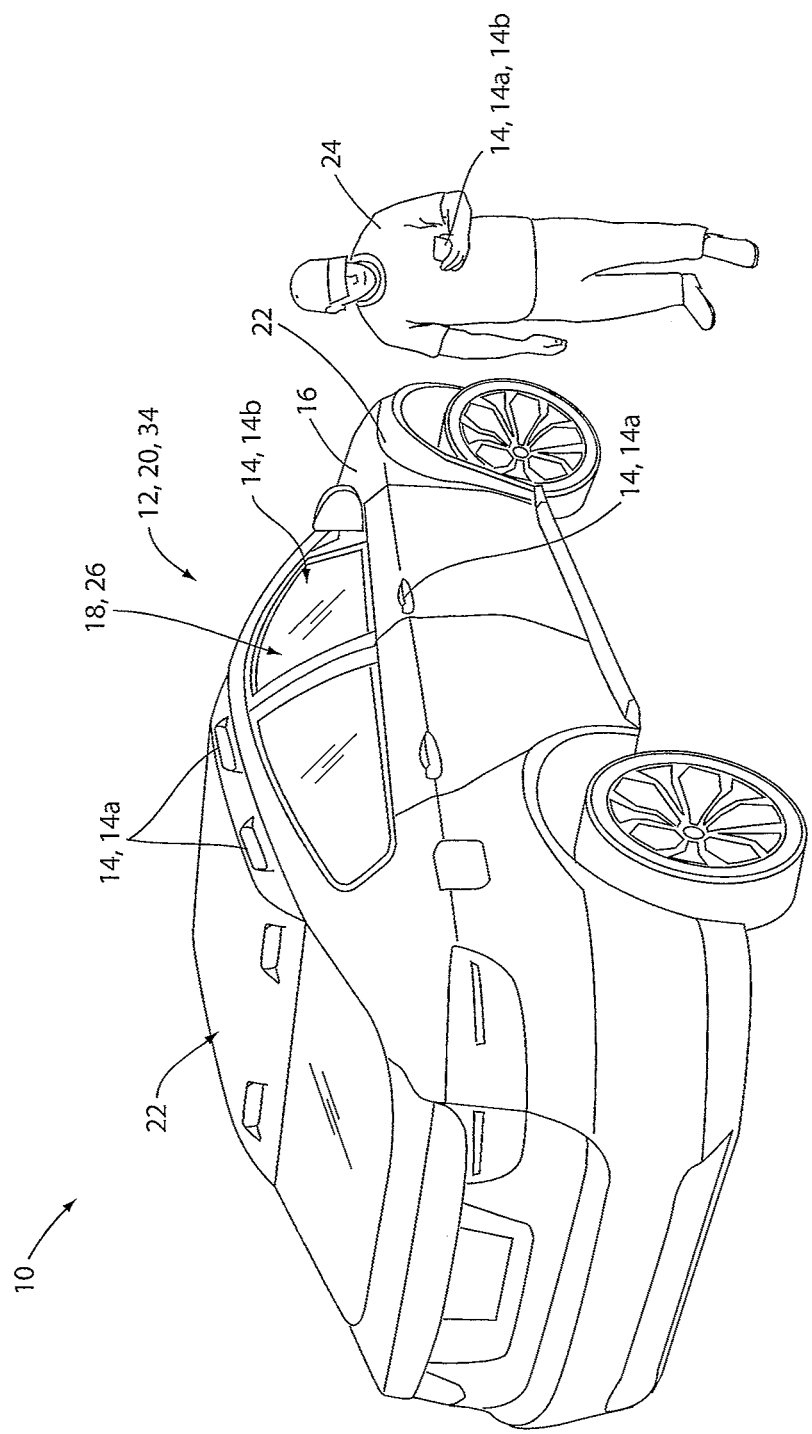
FIG. 1 is a projected view of a vehicle comprising an authentication system.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In various embodiments, the disclosure provides for an authentication system for a vehicle. The authentication system may be configured to capture identifying information for an occupant in order to authorize specific vehicle functions or operations. For example in some embodiments, the disclosure may provide for a scanning apparatus configured to detect one or more identifying characteristics of an occupant or potential occupant attempting to enter the vehicle. The scanning apparatus may be incorporated in one or more vehicle systems as further provided in the following detailed description.

Referring to FIG. 1, a projected view of a vehicle 10 comprising an authentication system 12 is shown. The vehicle 10 may correspond to a conventional passenger vehicle, an autonomous vehicle, or a wide variety of automotive vehicles. The authentication system 12 may comprise a scanning apparatus 14 incorporated on an exterior portion 16 and/or disposed within an interior cabin 18 of the vehicle 10. Accordingly, the scanning apparatus 14 may be flexibly configured to provide for a collection or capture of scanning data or biometric data to support an identity authentication for the authentication system 12. In some embodiments, the authentication system 20 may be in communication with a vehicle control system 22, which may be configured to control a variety of systems and subsystems of the vehicle 10 (e.g. an engine control unit, a navigation system, a vehicle guidance system, a cabin control module, etc.).

The scanning apparatus 14 may correspond to a biometric scanner configured to capture biometric data or scanning data of an occupant 24 or a potential occupant of the vehicle 10. For example, the scanning apparatus 14 may correspond to an iris imager or scanner, fingerprint scanner, face imager or scanner, voice scanner/recorder, or various other scanning devices. In some embodiments, scanning apparatus 14 may include or incorporate a plurality of the aforementioned types of apparatuses. The scanning data captured by and/or associated with the scanning apparatus 14 may be saved in a local memory or remote cloud server that may be accessible via a wireless communication interface. In this way, the authentication system 12 may access the local memory or a remote server to search and match scanning data or biometric data to an identification profile to identify the occupant 24. For clarity, a passenger, rider, and operator of the vehicle 10 will all be referred to as the occupant 24 of the vehicle 10.

As discussed herein, the terms identification and authentication may generally refer to an analysis completed by the authentication system 12 configured to identify the occupant 24 or a potential occupant of the vehicle 10. The disclosure provides for various embodiments configured to provide at least one authentication routine configured to securely indicate an identity of the occupant 24. Accordingly, the authentication may provide for an identification of an authenticated occupant and grant access and/or privileges to modify or control various features of the vehicle 10. In some embodiments, the system 12 may similarly be configured to access an identification profile configured to provide for the authentication of the occupant 24.

Based on the identification profile, the authentication system 12 may access and or update a variety of preferences and/or operational parameters of the vehicle 10. For example, the authentication system may be configured to authenticate the occupant 24 and communicate the authentication to the vehicle control system 22. In response to the authentication of the occupant 24, the control system 22 may be configured to receive or identify a plurality of occupant parameters associated with the occupant 24 and the identification profile. The occupant parameters may include, but are not limited to one or more of the following settings or preferences: a seat position, preset configurations (e.g. stations, light/display settings), themes, colors, control preferences, and/or any other configurable attributes of the vehicle 10. The occupant parameters may also include financial information associated with occupant 24 of the vehicle 10, including, e.g., information identifying a payment account, an authorization to apply a charge to the payment account, and a predetermined spending limit indicated for the payment account.

For example in an exemplary embodiment, radio station presets may be changed or set according to the profile of the occupant 24. The occupant 24 may then access and update the radio station presets on a media interface 26 or any suitable display or user interface. Additionally, navigation and/or map display settings of a navigation system may be updated or configured according to a profile comprising occupant parameters for the occupant 24. In such implementations, the profile may load a variety of pre-established navigation or display preferences, commonly visited locations, preferred travel routes, etc. in response to the authentication of the identity of the occupant 24. As further discussed herein, the identification profile, control preferences, and administrative privileges designated for the occupant 24 may be stored locally and/or accessed on a remote server.

In some embodiments, the authentication system 12 may be configured to access and control various home automation services based on the identification profile of the occupant 24. For example, the authentication system 12 may correspond to or be in communication with a trainable wireless accessory configured to control a remote electronic system or device. In this way, the authentication system 12 may be operable to access encoding and/or security information from or associated with the identification profile of the occupant 24. In this way, the authentication system 12 may access and load programming instructions for a trainable wireless accessory to control a variety of remote devices based on the authentication of the occupant 24. Remote devices may include, but are not limited to motorized barriers, locks, lights, and a variety of so-called "smarthome" devices. In an exemplary embodiment, the security accessory may correspond to a Homelink® trainable transceiver and may be constructed according to one or more embodiments disclosed in U.S. Pat. Nos. 6,091,343; 5,854,593 or 5,708,415, which are herein incorporated by reference in their entirety.

In some embodiments, the vehicle 10 may correspond to an autonomous vehicle and/or ride-share vehicle. The vehicle 10 may comprise one or more sensors (e.g. cameras, ultrasonic devices, capacitive sensors, etc.) some of which may be utilized as scanning apparatuses 14 as discussed herein. In such applications, the authentication of the occupant 24 may be advantageous to provide access and/or control a level of operation or administration of one or more operational controls of the vehicle 10. In an exemplary embodiment, the authentication system 12 may be configured to capture first scanning data with a first scanning apparatus 14*a*. The first scanning apparatus 14*a* may be located on an exterior portion 16 outside the vehicle 10 or may be portable as exemplified by a mobile device 28. In this way, the first scanning apparatus 14*a* may capture the first scanning data such that the authentication system 10 may provide for a first authentication to authorize entry into the vehicle 10 and/or load a custom profile including occupant parameters for the occupant 24.

In various embodiments, the mobile device 28 may be utilized to scan or capture scanning data or biometric data as discussed herein. The mobile device 28 may correspond to a portable computer, smartphone, personal data assistant (PDA), cellular telephone, or a variety of electronic devices. In such embodiments, the mobile device 28 may be configured to serve as a scanning apparatus 14. In this way, the authentication system 12 may provide for authentication from a variety of devices, which may be incorporated with the vehicle 10 and/or in communication with the vehicle 10. Further detailed discussion of the mobile device 28 is provided in reference to FIG. 7.

Figure 2:
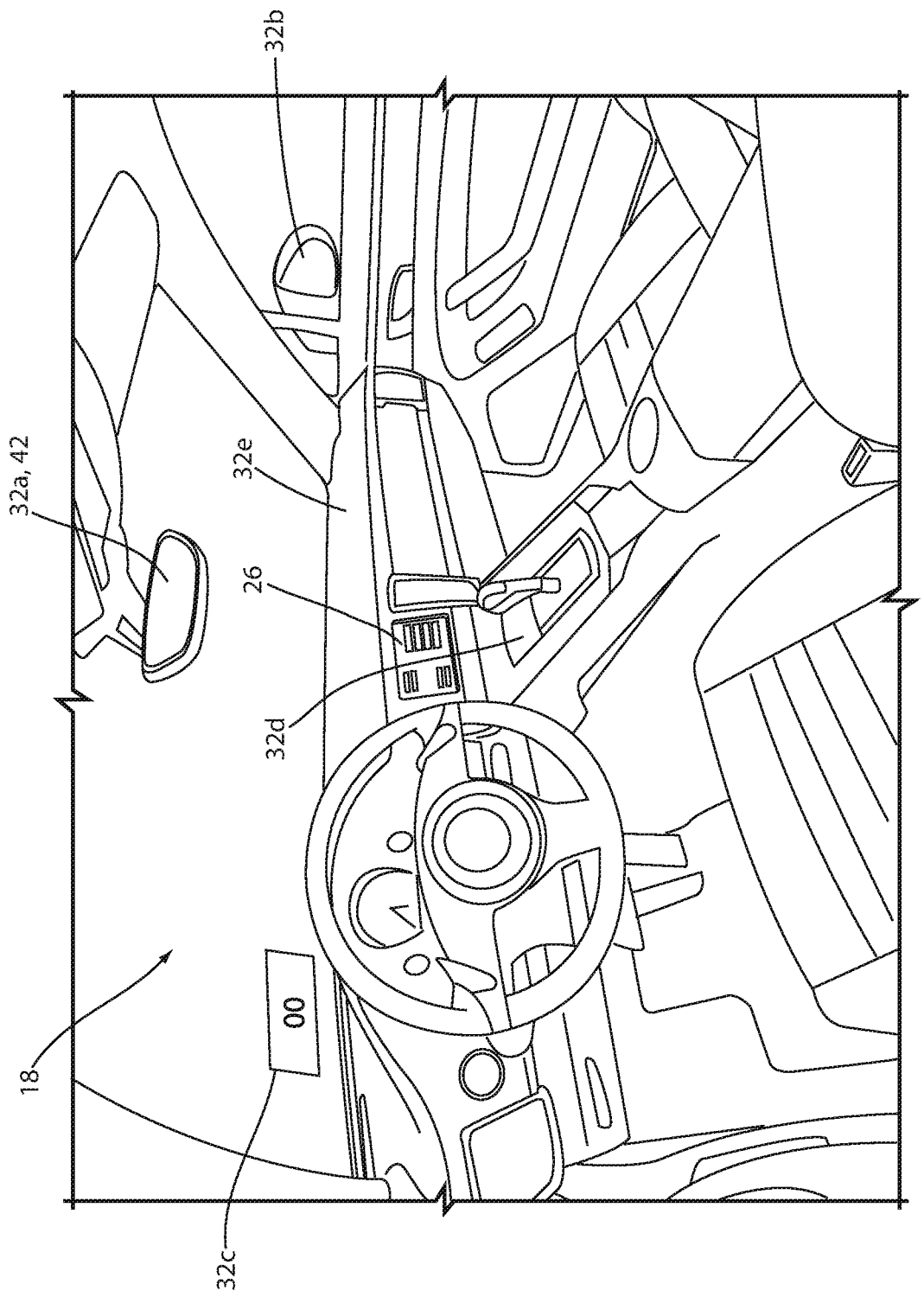
FIG. 2 is a projected view of a vehicle interior demonstrating an authentication system configured to identify an occupant of a vehicle.

FIG. 2 demonstrates a passenger cabin 18 of the vehicle 10. Referring now to FIGS. 1 and 2, in some embodiments, a second scanning apparatus 14*b* may be disposed within the passenger cabin 18 of the vehicle 10. In some embodiments, a second scanning apparatus 14*b* may be in communication with the authentication system 12 and configured to capture second scanning data. The second scanning data may be processed by the authentication system to identify a privilege level associated with the occupant 24 indicating a variety of authorized operational privileges and/or administrative privileges available to the occupant 24. The second scanning apparatus 14*b* may be incorporated as a component in one or more of an interior rearview mirror 32*a*, an exterior rearview mirror 32*b*, a heads-up display 32*c*, an interior console 32*d*, a dash 32*e*, or other locations of the passenger cabin 18. In this way, the authentication system 12 may provide various levels of security and operating privileges to ensure that the occupant 24 is authorized to access and utilize various features of the vehicle 10. Accordingly, the disclosure may provide for a variety of solutions that may be applied to improve secure access and operation of the vehicle 10.

In various embodiments, the authentication system 12 may be configured to utilize one or more communication circuits 34 to transmit or receive data from one or more remote servers or other devices. For example, in some embodiments, a controller of the authentication system 12 may be operable to send authentication data, biometric or scanning data, and various other forms of data to a remote server that may be configured to process the data to authenticate or identify an identification profile as discussed herein. Additionally, the controller may be operable to receive an authentication of the occupant 24, an identification profile, operating parameters or operational privileges for the vehicle 10, a software update or various information related to one or more systems from the remote server. Additionally, in some embodiments, the authentication system 12 may be in communication with the mobile device 28, which may be utilized alone or in combination with the scanning apparatuses 14 to capture the biometric and/or scanning data.

The biometric and/or scanning data may correspond to various forms of data, which may be configured to capture one or more unique or identifying characteristics of the occupant 24. The biometric data may correspond to image data, audio data, or various forms of sensory data. Such data may be utilized by the controller of the authentication system 12 and/or the remote server to process an iris recognition, fingerprint recognition, voice recognition, face recognition, gesture recognition or various forms of biometric processing that may be captured by the scanning apparatus(es) 14. Accordingly, the authentication system 12 may be configured to authenticate an identity of the occupant 24 in a variety of ways to suit a desired application.

In implementations that utilize the one or more communication circuits 34 to communicate with the mobile device 28 and/or the remote server, the authentication system 12 may be in communication with a communication network operable to connect to a server, the internet, and/or a portal configured to securely communicate information. For example, the authentication system 12 and/or the mobile device 28 may comprise one or more communication circuits 34 configured to communicate with a private server (e.g. a security provider). Further details describing the authentication system 12, the mobile device 28, and the remote server are discussed in reference to FIG. 7.

Figure 3:
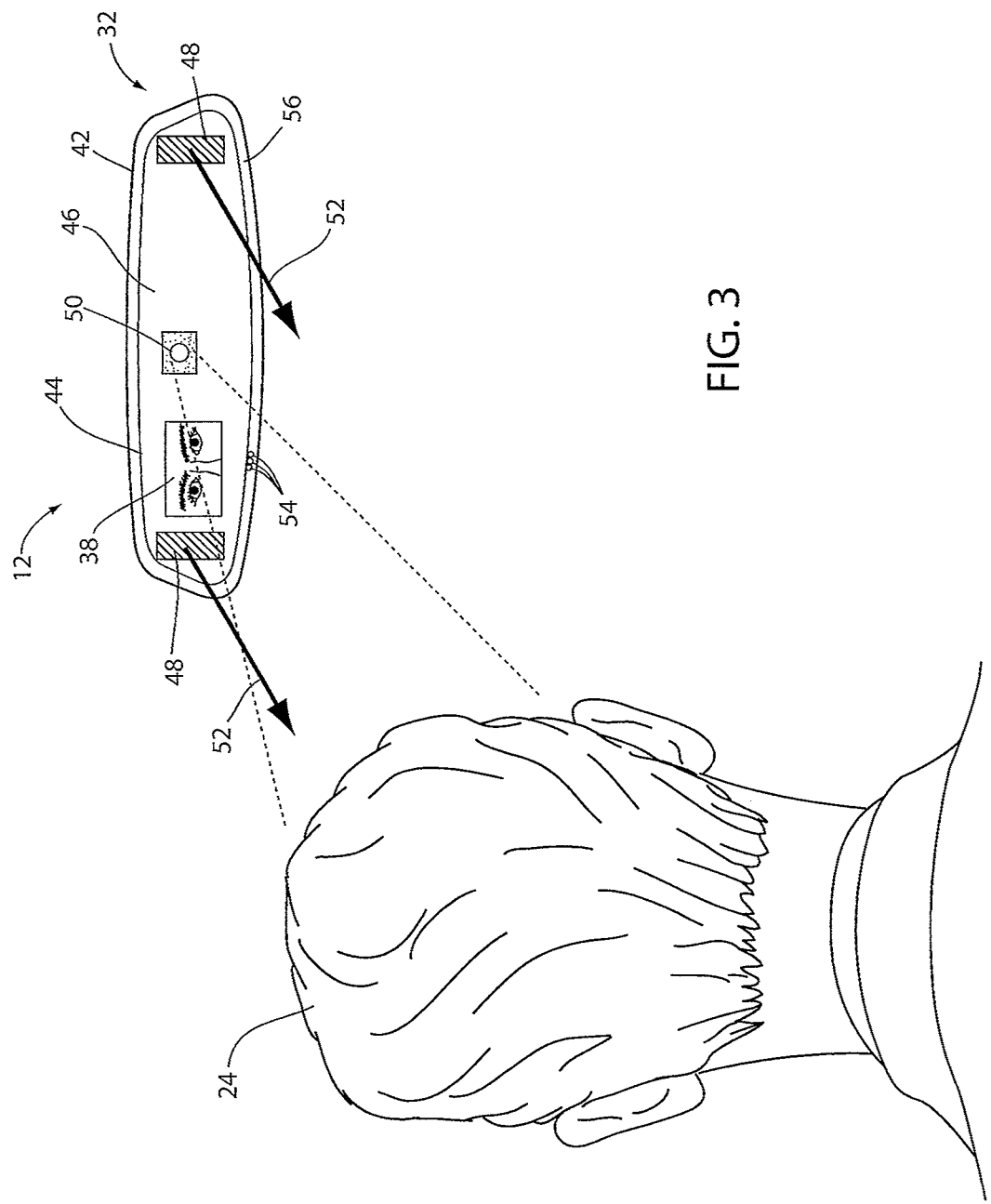
FIG. 3 is a schematic diagram of an scanning apparatus for a vehicle.

Referring now to FIG. 3, an exemplary embodiment of the scanning apparatus 14, 14*a* is shown. As discussed herein, the scanning apparatus 14, 14*a* may be operable to perform an identification or authentication function. In an exemplary embodiment, the scanning apparatus 14 is shown incorporated in an interior rearview mirror assembly 42. The mirror assembly 42 may correspond to an electro-optic assembly 44 having an electrochromic (EC) mirror element. The identification function may correspond to an eye-scan-identification function. In this configuration, the scanning apparatus 14 may provide for an interior rearview mirror assembly 42 configured to authenticate an identity of the occupant 24 based on an eye-scan identification function.

A scanning operation of the scanning apparatus may be initiated by activating an icon representing an "eye," which may be displayed on a display screen 46. The display of the icon may alert the occupant 24 to initiate identification by positioning his or her face in a particular position. The eye-scan-identification function may utilize an infrared illumination emitted toward an eye of the occupant 24 from one or more emitters 48 to illuminate the eye for the identification. Such illumination may be optimized in conditions allowing for a high optical transmittance in the near infrared (NIR) range. In some embodiments, the disclosure may provide for an electrochromic (EC) stack of the electro-optic assembly that may have a high light transmittance in the NIR range, for example wavelengths of light ranging from 800 nm to 940 nm. Additionally, in some implementations, the electro-optic assembly may comprise a plurality of light sources configured to illuminate at least one iris of the occupant 24 of the vehicle 10.

To provide for the eye-scan-identification function of the authentication system 12, an image sensor 50 may be disposed proximate a rear surface of the electro-optic assembly 44. The image sensor 50 may correspond to, for example, a digital charge-coupled device (CCD) or complementary metal-oxide-semiconductor (CMOS) active pixel sensor, although may not be limited to these exemplary devices. The image sensor 50 may be in communication with the at least one emitter 48. The emitter 48 may correspond to a plurality of infrared emitter banks configured to output an emission 52 in the NIR range. Each of the infrared emitter banks may comprise a plurality of light emitting diodes, which may be grouped in a matrix or otherwise grouped and disposed behind a rear surface of the electro-optic device. In this configuration, the scanning apparatus 14 may be configured to illuminate the eyes of the occupant 24 such that the image sensor 50 may capture image data including details of the irises of the eyes.

The display 38 may be disposed in the mirror assembly 42 and may be operable to display the image data received from the image sensor 50 such that the occupant may view the image data. In this configuration, the occupant 24 may adjust a position of the eyes shown on the display 38 to position the eyes such that the scanning data or biometric data may include the necessary features required to identify the occupant. In an exemplary embodiment, the features required to identify the occupant 24 of the vehicle 10 may correspond to features of one or more of the eyes of the occupant 24 (e.g. the irises).

The display 38 may correspond to a partial or full display mirror configured to display an image data through at least a portion of the mirror assembly 42. The display 38 may be constructed utilizing various technologies, for example LCD, LED, OLED, plasma, DLP or other display technology. Examples of display assemblies that may be utilized with the disclosure may include U.S. Pat. No. 6,572,233 "Rearview display mirror," U.S. Pat. No. 8,237,909 entitled "Vehicular rearview mirror assembly 42 including integrated backlighting for a liquid crystal display (LCD)," U.S. Pat. No. 8,411,245 "Multi-display mirror system and method for expanded view around a vehicle," and U.S. Pat.

No. 8,339,526 "Vehicle rearview mirror assembly including a high intensity display," which are incorporated herein by reference in their entirety.

The scanning apparatus 14 may further comprise an indicator 54 in the mirror assembly 42. The indicator 54 may be in communication with the controller and configured to output a signal to identify a state of the scanning apparatus 14 and/or a rearview camera. The indicator 54 may correspond to a light source that may be operable to flash and/or change colors to communicate a state of the scanning apparatus 14. The indicator 54 may correspond to a light emitting diode (LED), and in an exemplary embodiment, the indicator 54 may correspond to a red, green, and blue (RGB) LED operable to identify the state of the scanning apparatus 14 by outputting one or more colored emissions of light.

The various components of the electro-optic assembly 44 and the scanning apparatus 14 may be contained within a housing 56 of the mirror assembly 42. In this way, the various components discussed herein may be substantially hidden from a view of the occupant 24. Accordingly, the disclosure may provide for various advanced functions from the electro-optic assembly 44 and the scanning apparatus 14 while maintaining an appearance of a conventional rearview mirror.

Figure 4:
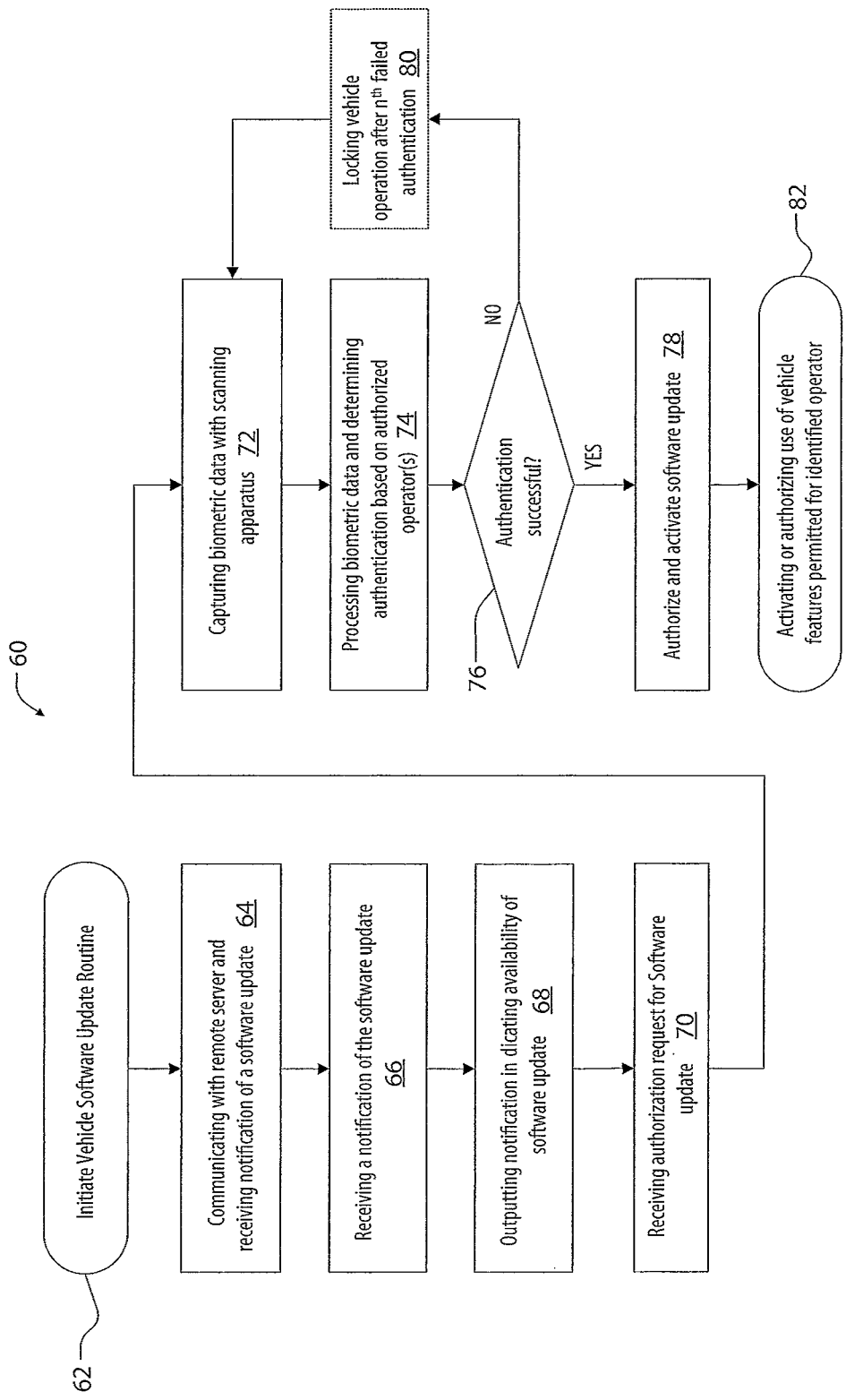
FIG. 4 is a flow chart demonstrating a method for updating a vehicle operation module or software.

Referring now to FIG. 4, a flow chart demonstrating a method 60 for updating an operating module or software program for the vehicle control system 22 is shown. As previously discussed, the vehicle control system 22 may comprise one or more systems and/or subsystems of the vehicle 10 (e.g. an engine control unit, a navigation system, a vehicle guidance system, a cabin control module, etc.), which may periodically require software updates. The method 60 may begin by initiating a vehicle software update routine (62). The method 60 may initiate the routine in response to predetermined update timing or a variety of system events (e.g. an ignition or startup sequence of the vehicle 10). The routine may begin by the authentication system 12 communicating with a remote server via the communication circuit 34 and receiving a notification of a software update (64). Based on the communication, the controller may receive a notification of the software update (66). Further discussion of the authentication system 12, the scanning apparatus 14, the communication circuit 34, the controller, and various other components that may be utilized in combination with the scanning apparatus is provided in reference to FIG. 7.

In response to identifying the notification of the software update, the controller may output a notification indicating the availability of the software update (68). The notification may be displayed on the media interface 26. In response to the notification, the controller may receive a request from the occupant 24 for authorization to initiate the software update (70). In response to the request for the software update, the method 60 may continue to capture biometric data from one or more of the scanning apparatuses 14 (72). Once the biometric data is captured, the method 60 may continue by processing the biometric data and determining an authentication for the occupant 24 (74).

In step 76, the controller may proceed to determine if the authentication is successful or unsuccessful. For example, the authentication may be considered successful if the biometric data captured for the occupant 24 is associated with an authorized user and may proceed to step 78. The authentication may be considered unsuccessful if the biometric data captured for the occupant 24 is not identified as corresponding to an authorized user and may return to step 72 to re-scan or capture the biometric data. If the occupant is not identified as an authorized user, after a predetermined number of failed attempts (e.g. n failed attempts), the controller may lock the authentication process and halt the method 60 and/or operation of the vehicle 10 (80).

Upon successful authentication of the occupant 24, the method 60 may authorize and/or activate the software update (78). Additionally, the controller may continue the method 60 to activate or authorize use of any other features or privileges permitted for the occupant 24 based on a privilege level associated with an identification profile (82). For example, the method may be similarly implemented by the controller in response to a request to access a variety of functions, controls, and/or administrative settings associated with the vehicle 10. In such embodiments, the method may be initiated in step 72 to identify if the occupant 24 is authorized to complete a requested process or task. Such a method is further discussed in reference to FIG. 5.

As previously discussed, the processing or authentication of the biometric data may be processed locally by the controller and/or communicated to a remote server. For example, the controller of the authentication system 12 may be operable to send authentication data, biometric or scanning data, and various other forms of data to a remote server that may be configured to process the data to authenticate or identify an identification profile as discussed herein. Additionally, the controller may be operable to receive one or more of the following from the remote server: an authentication of the occupant 24, an identification profile, operating parameters or operational privileges for the vehicle 10, a software update or various information related to one or more systems of the vehicle.

Figure 5:
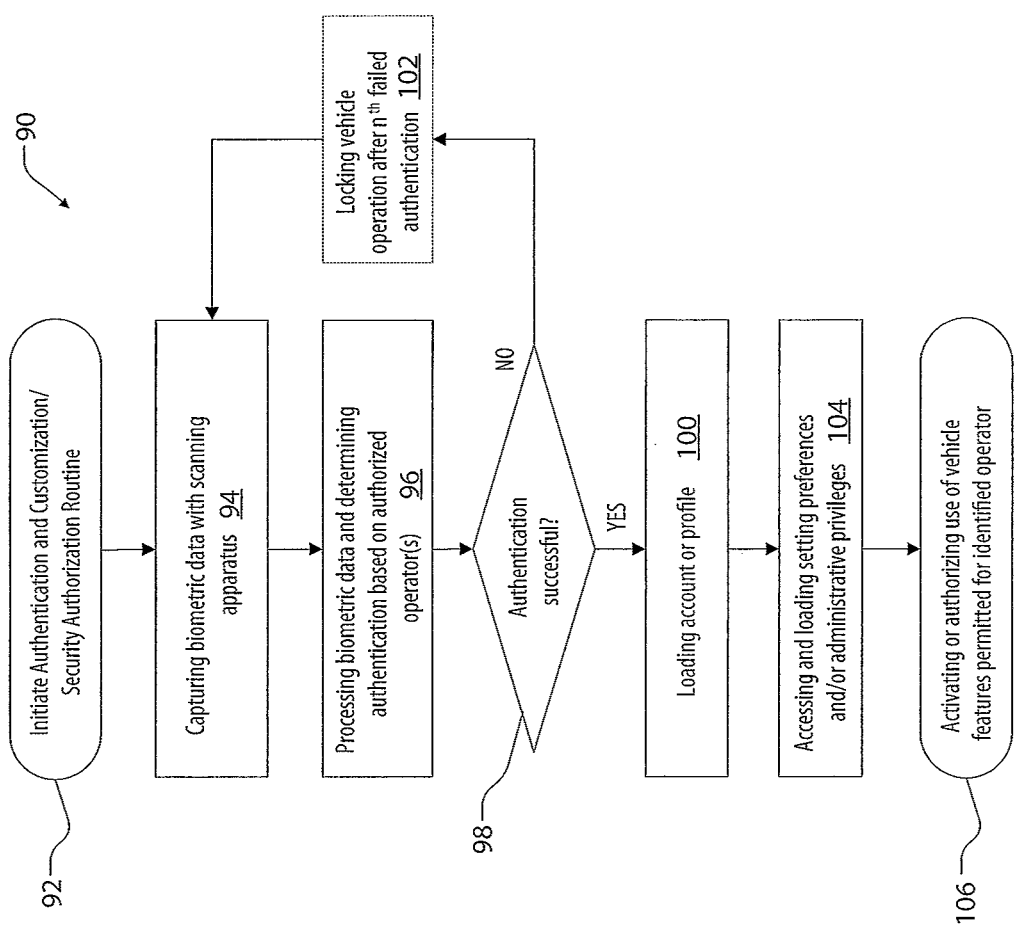
FIG. 5 is a flow chart demonstrating a method for authenticating an identity of an occupant of a vehicle.

Referring now to FIG. 5, a flow chart of a method 90 is shown. The method 90 may be configured to authenticate an identity of the occupant 24 to provide for a customization of one or more systems of the vehicle 10 and may also be utilized to identify a security authorization indicating a privilege level of the occupant 24. The method 90 may be initiated in response to a variety of requests to control or access one or more functions or settings of the vehicle 10 (92). For example, the controller of the authentication system 12 may initiate the method 90 in response one or more of the following exemplary interactions: a request to access the vehicle 10, a request for startup or ignition of the vehicle 10, a request to adjust a user setting, a request to load a user profile, activate one or more user privileges, or any function of the vehicle 10. Such requests may be detected by the controller via the media interface 26, an entry sensor or handle, and any form of input (e.g. ignition input, brake pedal, etc.) in communication with the authentication system 12. Once initiated, the method 90 may be configured to access the user profile to control the privileges and/or occupant parameters associated the identification profile of the occupant 24.

In response to the request in step 92, the method 90 may continue to capture biometric data or scan data from one or more of the scanning apparatuses 14 (94). Once the biometric data is captured, the method 90 may continue by processing the biometric data to determine if the occupant 24 is authorized to perform a requested function or access a control preference (96). In step 98, the controller may proceed to determine if the authentication is successful or unsuccessful. The authentication may be considered successful if the biometric data captured for the occupant 24 is identified as corresponding to an authorized user and the method 90 may proceed to step 100.

The authentication may be considered unsuccessful if the biometric data captured for the occupant 24 is not identified as corresponding to an authorized user and may return to step 94 to re-scan or capture the biometric data. If the occupant is not identified as an authorized user, after a predetermined number of failed attempts (e.g. n failed attempts), the controller may lock the authentication process and halt the method 90 (102). In this way, the authentication system 12 may limit access to a desired feature or function, and/or operation of the vehicle 10.

Upon successful authentication of the occupant 24, the method 90 may continue to load an account or user profile associated with the occupant 24 (100). Based on the account or profile, the authentication system 12 may access occupant parameters (e.g. user settings), operational privileges, and/or administrative privileges associated with the identification profile and corresponding profile or account information based on the identity of the occupant 24 (104). Such settings or privileges may be stored locally in a memory of the authentication system 12 and/or accessed from the remote server via the communication circuit 34. Based on the settings or privileges identified according to the authentication of the occupant 24, the authentication system 12 may complete the authorization routine by granting access, loading settings, or otherwise controlling use of one or more systems of the vehicle 10 in conformance with the settings and privileges identified in the profile or account identified for occupant 24 (106).

Figure 7:
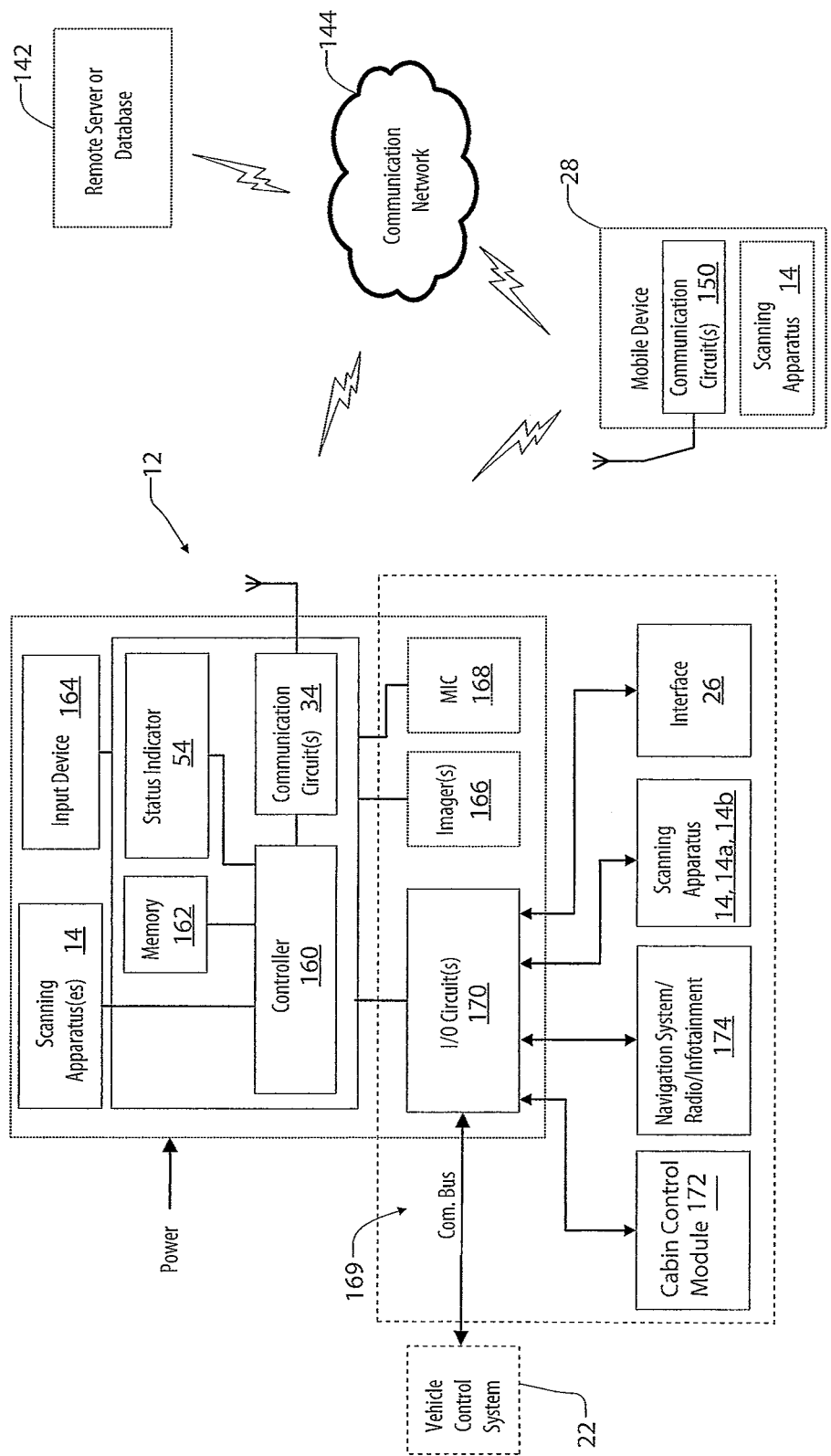
FIG. 7 is a block diagram of an authentication system demonstrated in communication with a remote server or database in accordance with the disclosure.

The method 90 may be applied to set a wide variety of preference settings. For example, the authentication system may be in communication with various vehicle systems configured to control one or more of the following settings or occupant parameters: a seat position, preset configurations (e.g. stations, light/display settings), themes, colors, control preferences, and various additional configurable attributes of the vehicle 10. The systems configured to control these settings as well as others discussed herein may be in communication with the authentication system 12 via the vehicle control system 22, which may be configured to control the systems via the vehicle bus as illustrated in FIG. 7. In this way, the authentication system 12 may provide for the occupant parameters to be automatically activated, configured, and/or loaded in response to the profile or account identified for the occupant 24.

Additionally, the method 90 may be configured to control a privilege level identifying various features, controls, and/or functions of the vehicle 10. For example, a privilege level may indicate whether the occupant 24 is authorized to modify or control various features of the vehicle 10. Functions that may be controlled by the authentication system 12 may include but are not limited to a software update routine privilege, a vehicle operation privilege, an identification training routine privilege, a user preset control privilege, an operational speed control setting privilege, a geographic travel restriction privilege, and various other operational controls that may be associated with the vehicle 10.

Figure 6:
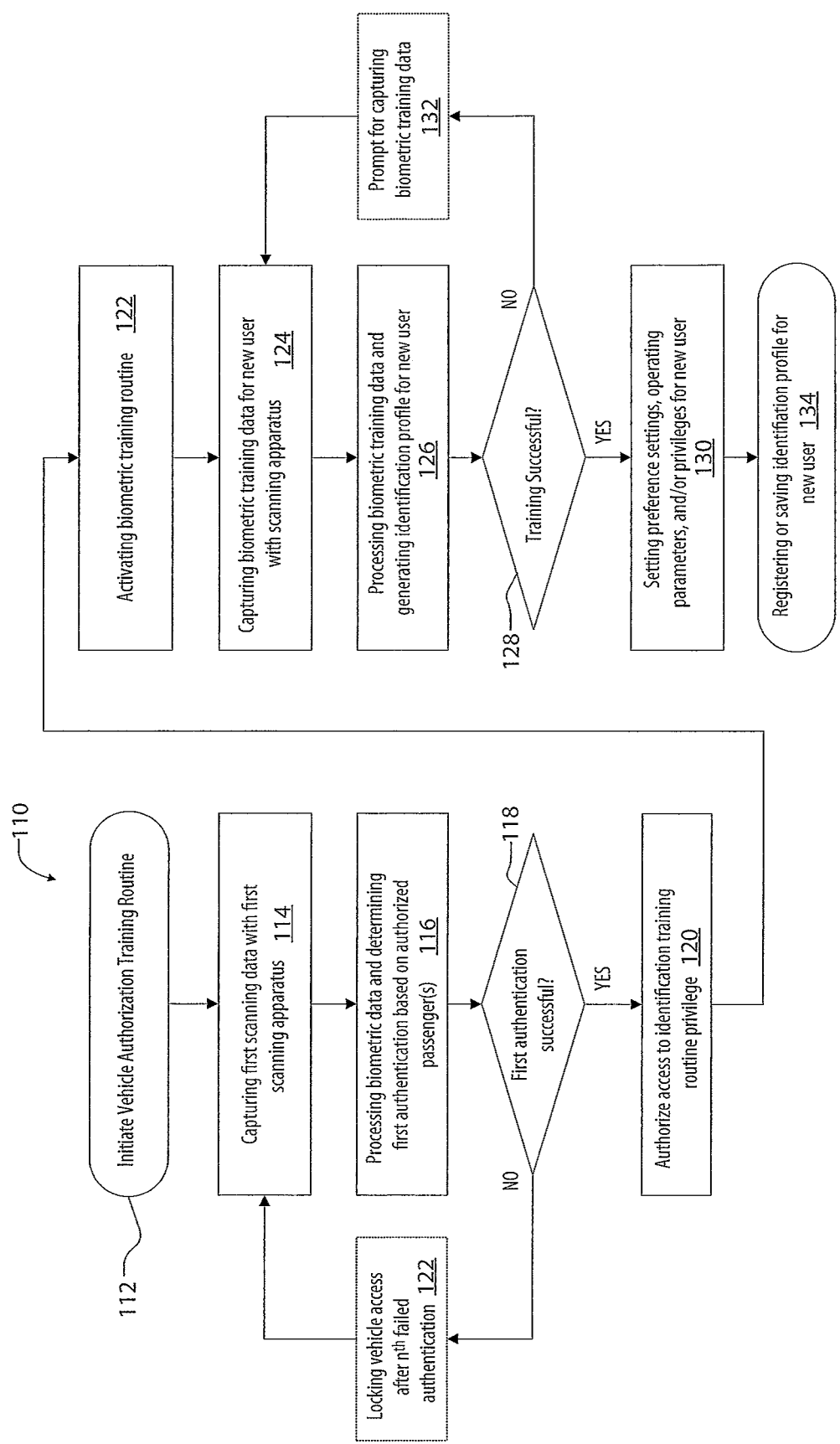
FIG. 6 is a flow chart demonstrating a vehicle authorization training routine.

Referring now to FIG. 6 a flow chart demonstrating a method 110 for a vehicle authorization training routine is shown. The training routine may be initiated by the controller of the authentication system in response to an input into the media interface 26 or human machine interface (HMI) (112). The method 110 may then continue to capture biometric data or scan data from one or more of the scanning apparatuses 14 (114). Once the biometric data is captured, the method 110 may continue by processing the biometric data and determining an authentication or identification for the occupant 24 (116).

In step 118, the controller may proceed to determine if the authentication is successful or unsuccessful. For example, the authentication may be considered successful if the biometric data captured for the occupant 24 indicates that the occupant 24 is authorized to access an identification training privilege and may accordingly proceed to step 120. The authentication may be considered unsuccessful if the biometric data captured for the occupant 24 is not identified as corresponding to an authorized user and may return to step 114 to re-scan or capture the biometric data. If the occupant 24 is not identified as an authorized user, after a predetermined number of failed attempts (e.g. n failed attempts), the controller may lock the authentication process and halt the method 110 (122).

Upon authentication of the occupant 24 identifying that the occupant 24 is authorized to perform the identification training routine, the method 110 may continue to activate the identification training routine (122). The identification training routine may begin by capturing biometric training data for a new user with one or more of the scanning apparatuses 14 (124). Once the biometric training data is captured, the method 110 may continue by processing the biometric training data to generate an identification profile for the new user (126).

In step 128, the controller may proceed to determine if the creation of the identification profile for the new user is successful or unsuccessful. The creation of the identification profile may be successful if the biometric data captured for the new user adequately captures one or more identifying features of the occupant 24 required to generate the identification profile for authentication. If the profile creation is successful, the method 110 may proceed to set preference settings, operating parameters, and/or administrative or operational privileges associated with the identification profile of the new user (130). If the creation of the identification profile for the new user is unsuccessful in step 128, the method may prompt the new user to re-capture the biometric training data and return to step 124 (132).

Following step 130, the method 110 may continue to save the identification profile for the new user (134). The identification profile for the new user as well the various authentication information and identification profiles discussed herein may be registered or stored locally in the authentication system 12 and/or stored in the remote server accessed via the communication circuit 34. In this way, the identification profile(s), preference settings, operating parameters, and/or administrative or operational privileges may be accessed by any authentication system in communication with the remote server. In this way, the authentication system 12 may provide for various embodiments for accessing and customizing settings for ride-share vehicles, autonomous taxis, service vehicles as well as privately owned vehicles.

Referring now to FIG. 7, a block diagram of the authentication system 12 is shown in communication with a remote server or database in accordance with the disclosure. The authentication system 12 may incorporate or be in communication with various input devices, transducers, and/or sensors. Such devices may be commonly referred herein as scanning apparatuses 14 for clarity. The scanning apparatuses 14 may be configured to capture data and/or receive inputs from various vehicle systems and/or be configured to capture and communicate data with the authentication system 12. The authentication system 12 may then authenticate and determine an identity of the occupant 24 or potential occupant of the vehicle 10 to control or access preference settings, operating parameters, and/or administrative or operational privileges for the vehicle 10.

In an exemplary embodiment, the authentication system 12 may comprise the one or more communication circuits 34 that may be configured to communicate with the mobile device 28, a remote server 142, and/or any device connected via a compatible communication network 144 or interface. The communication network 144 may correspond to various forms of wireless communication, for example Bluetooth, Bluetooth Low-energy (BT-LE), Near Field Communication (NFC), and/or the like. Examples of standards related to NFC include ISO 18000-3, ISO 13157, and the like, and examples of standards related to BT-LE include IEEE 802.15.1 and the like. Additionally, the communication network 144 may be configured to operate using one or more of a plurality of radio access technologies including one or more of the following: Long Term Evolution (LTE), wireless local area network (WLAN) technology, such as 802.11 Wi-Fi and the like, and other radio technologies as well.

In implementations that utilize the mobile device 28 as a scanning apparatus 14 in an authentication process, the mobile device 28 may be operable to connect to a server, the internet, and/or a portal configured to receive an authentication. For example, the mobile device 28 may comprise one or more communication circuits 150 similar to those discussed herein to communicate with the remote server 142 to process or perform one or more of the authentication task or routines based on an identification profile. In various embodiments, the identification profile may be stored on the mobile device 28 and/or the remote server 142. In this configuration, the mobile device 28 may process or complete one or more of the authentication routines or methods discussed herein and communicate an authentication or identification profile to the authentication system 12 to identify the occupant 24.

In some embodiments, the authentication system 12 may be configured to compare and/or process the data received from the scanning apparatuses 14 to authenticate or identify a security confidence corresponding to a percent likelihood that an identity of a party to a transaction is authentic. Based on the confidence determination, the authentication system 12 may require an additional authentication which may be completed utilizing a different scanning apparatus 14 or scanning technology. For example, if a voice recognition authentication returned a low authentication confidence, the authentication system 12 may request a secondary authentication with an iris scanning device (e.g. the scanning apparatus 14 of the mirror assembly 42). In this way, the authentication system 12 may ensure a minimum confidence for the authentication.

The authentication system 12 may comprise a controller 160 configured to control various components and/or integrated circuits of the system 12. The controller 160 may include various types of control circuitry, digital and/or analog, and may include a microprocessor, microcontroller, application-specific integrated circuit (ASIC), or other circuitry configured to perform various input/output, control, analysis, and other functions to be described herein. The controller 160 may be in communication with a memory 162 configured to store one or more routines as discussed herein. The memory may comprise a variety of volatile and non-volatile memory formats.

The controller 160 may be coupled to an input device 164, which may comprise one or more switches, but may alternatively include other user input devices, such as, switches, knobs, dials, alpha or numeric input devices, etc. Additionally, the authentication system 12 may comprise various data devices including but not limited to the input device 164, one or more imagers 166, a microphone 168, and various other sensors or inputs that may be implemented in the vehicle 10. Data received by each of the sensors or scanning apparatuses 14 may be processed by the controller 160 or the remote server 142 to identify or authenticate the occupant 24.

As discussed herein, the authentication system 12 may be in communication with a variety of vehicle systems. For example, the authentication system 12 is shown in communication with the vehicle control system 22 via a communication bus 169. Additionally, the controller 160 may be in communication with a plurality of vehicle systems via one or more input-output (I/O) circuits 170. For example, the authentication system 12 may be in communication with a cabin control module 172 configured to adjust a seat position, comfort setting, and/or window setting corresponding to a control preference or setting of the occupant 24.

Still referring to FIG. 7, in some embodiments, the control system 12 may be in communication with one or more additional systems of the vehicle 10 via the I/O circuits 170. The I/O circuits 170 may be in communication with various devices or vehicle accessories. For example, the I/O circuits 170 may be in communication with a navigation system 174, one or more scanning apparatuses 14 and any other form of vehicle accessory or device incorporated in the vehicle 10. The controller 160 may receive location data from a GPS module incorporated in the navigation system 174. Though described as a navigation system, the system may correspond to a radio, infotainment system, HMI, or a variety of guidance or entertainment systems that may be implemented in the vehicle 10. Accordingly, the authentication system 12 may be operable to update various settings to customize various presets, themes, and settings that may be associated with various vehicle accessories as discussed herein.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An authentication system in communication with a vehicle control system, the authentication system comprising:
    a communication circuit configured to communicate with a remote server;
    a rearview assembly in adjustable connection with the vehicle, wherein the rearview mirror assembly is configured to reflect a rearward directed view from the vehicle to an operator of the vehicle;
    at least one scanning apparatus disposed in the rearview assembly and configured to capture image data comprising a biometric data in a field of view directed to a facial region of the operator, wherein the field of view is adjustable via the adjustable connection of the rearview assembly such that the facial region is captured in the field of view and the rearward directed view is reflected to the operator;

an emitter configured to emit scanning light from a display surface of the rearview assembly in a near infrared (NIR) spectrum;

a display forming at least a portion of the display surface and configured to display the image data demonstrating reflected light from the scanning light indicating a position of the operator in the field of view, wherein the image data provides visual feedback to the operator to adjust the position within the field of view to capture facial region of the operator required to process an authentication; and a controller in communication with the communication circuit and the scanning apparatus, wherein the controller is configured to:
 receive a request for a security authorization;
 capture the biometric data with the scanning apparatus;
 compare the biometric data to authentication data, wherein the authentication data comprises a first identification profile configured to authenticate a previously identified individual;
 authenticate the previously identified individual based on the first identification profile; and
 communicate a privilege level associated with the first identification profile, wherein the vehicle control system is configured to determine the security authorization in response to the privilege level.

2. The authentication system according to claim 1, wherein the controller is further configured to:
 enable the authorized user to access an identification training routine.

3. The authentication system according to claim 2, wherein the identification training routine is authorized in response to the privilege level of the first identification profile indicating an identification training routine privilege.

4. The authentication system according to claim 2, wherein the identification training routine comprises the controller configured to:
 capture training data with the scanning apparatus for an unidentified individual.

5. The authentication system according to claim 4, wherein the identification training routine further comprises the controller configured to:
 generate a second identification profile based on the training data for the unidentified individual.

6. The authentication system according to claim 1, wherein the identification training routine further comprises the controller configured to:
 receive an input identifying a privilege level indicating the privilege level for the second identification profile.

7. The authentication system according to claim 6, wherein the privilege level designates the security authorization for one or more user privileges authorized for the second identification profile.

8. A method for processing a security authorization for a vehicle control system in communication with an authentication system, the method comprising:
 reflecting a rearward directed view from a rearview assembly to an operator of the vehicle;
 capturing biometric data in a field of view extending from a scanning apparatus disposed in the rearview assembly of a vehicle comprising the authentication system;
 adjusting a field of view of the scanning apparatus by adjusting an orientation of the rearview assembly, wherein the rearward directed view is reflected to the operator and the field of view is directed to capture the biometric data of the operator;
 displaying a feedback image on a display surface of the rearview assembly indicating the biometric data captured by the scanning apparatus on a display of the vehicle, wherein the feedback image demonstrates a position of at least one feature of the operator required to authenticate a previously identified individual;
 aligning at least one feature of the operator via the feedback image;
 comparing the biometric data to authentication data, wherein the authentication data comprises an identification profile configured to authenticate the previously identified individual;
 authenticating the previously identified individual based on the identification profile thereby identifying an authorized user;
 accessing a plurality of occupant parameters in response to the identification profile; and
 communicating the occupant parameters to the vehicle control system, wherein the vehicle control system is configured to load the occupant parameters to customize one or more operational settings of the vehicle.

9. The method according to claim 8, further comprising:
 accessing the identification profile from a remote server via a communication circuit based on the authentication comparison of the biometric data to the authentication data.

10. The method according to claim 8, further comprising:
 communicating the biometric data to the remote server, wherein the remote server is configured to process an authentication routine.

11. The method according to claim 10, wherein the authentication routine comprises matching the biometric data to the identification profile thereby authenticating the authorized user.

12. The method according to claim 11, further comprising:
 receiving a communication from the remote server indicating an authentication of the authorized user, wherein the communication comprises the plurality of occupant parameters.

13. The method according to claim 8, wherein the occupant parameters comprise at least one of a navigation setting, a radio station preset, a selection of a decorative theme, a seat position setting, a mirror setting, and a driver assist system setting.

14. The method according to claim 8, wherein the occupant parameters comprise information identifying a payment account and an authorization to apply a charge to the payment account.

15. The method according to claim 8, wherein the occupant parameters comprise a programming code for a programmable wireless transmitter configured to control a remote device.

16. An authentication system in communication with a vehicle control system, the authentication system comprising:
 a communication circuit configured to communicate with a remote server;
 a rearview assembly in adjustable connection with the vehicle, wherein the rearview mirror assembly is configured to reflect a rearward directed view from the vehicle to an operator of the vehicle;
 a display forming at least a portion of a viewing surface of the rearview assembly;

at least one scanning apparatus disposed in the rearview assembly and configured to capture image data comprising a biometric data of the operator in a field of view, wherein the field of view is adjustable via the adjustable connection of the rearview assembly such that the biometric data is captured in the field of view and the rearward directed view is reflected to the operator; and an emitter disposed in the rearview assembly and configured to emit scanning light from the viewing surface of the rearview assembly;

a controller in communication with the communication circuit and the scanning apparatus, wherein the controller is configured to:
  receive a notification of a pending software update to the vehicle control system from the communication circuit;
  capture the biometric data in the field of view with the scanning apparatus;
  display the image data as a feedback image on the display indicating a position of the biometric data of the operator in the field of view, wherein the feedback image demonstrates at least one necessary feature required to authenticate the operator;
  compare the biometric data to authentication data, wherein the authentication data comprises an identification profile configured to authenticate a previously identified individual;
  authenticate the previously identified individual based on the identification profile; and
  enable a security authorization for the vehicle control system.

17. The authentication system according to claim 16, wherein the security authorization is configured to selectively enable the vehicle control system to activate a software update routine configured to apply the software update.

18. The authentication system according to claim 16, wherein the vehicle control system is configured to authorize the software update in response to a privilege level of the identification profile indicating a software update routine privilege.

\* \* \* \* \*